US009471357B2

(12) United States Patent
Ayanam et al.

(10) Patent No.: US 9,471,357 B2
(45) Date of Patent: Oct. 18, 2016

(54) MONITORING VIRTUAL MACHINE INTERFACE AND LOCAL GRAPHICAL USER INTERFACE ON A THIN CLIENT AND ALTERNATING THEREBETWEEN (71) Applicant: AMERICAN MEGATRENDS, INC., Norcross, GA (US)

(72) Inventors: Varadachari Sudan Ayanam, Suwanee, GA (US); Samvinesh Christopher, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 306 days.

(21) Appl. No.: 14/026,814

(22) Filed: Sep. 13, 2013

(65) Prior Publication Data
US 2015/0082179 A1 Mar. 19, 2015

(51) Int. Cl.
G06F 3/048 (2013.01)
G06F 9/455 (2006.01)
G06F 11/30 (2006.01)
H04L 29/06 (2006.01)
H04L 29/08 (2006.01)
G06F 9/44 (2006.01)

(52) U.S. Cl.
CPC ......... G06F 9/45558 (2013.01); G06F 9/4445 (2013.01); G06F 11/30 (2013.01); H04L 63/00 (2013.01); H04L 67/143 (2013.01)

(58) Field of Classification Search
CPC .................. G06F 3/048; H04L 12/24
See application file for complete search history.

(56) References Cited

U.S. PATENT DOCUMENTS

| 2009/0049174 A1* | 2/2009 | Rudnik .................. 709/226 |
| 2011/0078432 A1* | 3/2011 | Wu ........................ 713/2 |
| 2011/0185355 A1* | 7/2011 | Chawla et al. .......... 718/1 |
| 2012/0076197 A1* | 3/2012 | Byford et al. ...... 375/240.01 |
| 2012/0127173 A1* | 5/2012 | Elliott Swift et al. ... 345/419 |
| 2012/0173755 A1* | 7/2012 | Margulis ............... 709/231 |
| 2014/0189204 A1* | 7/2014 | Sugimoto et al. ...... 711/103 |

* cited by examiner

Primary Examiner — William Bashore
Assistant Examiner — Jeanette J Parker
(74) Attorney, Agent, or Firm — Locke Lord LLP; Tim Tingkang Xia, Esq.

(57) ABSTRACT

Technologies are described herein for alternating between a local graphical user interface (UI) and a virtual machine interface, on a computing device such as a thin client or a zero client. In particular, a virtual desktop client (VDC), which is in communication with a virtual machine hosted by a hypervisor on a remote computer system, receives desktop video display signals from the virtual machine. A monitoring application monitors the execution status of the VDC. Upon determining that the VDC has been terminated, the monitoring application is configured to present the UI by re-initializing, relaunching, or rebooting the UI, by retrieving display data associated with the UI from a RAM device, or by other means.

26 Claims, 4 Drawing Sheets

MONITORING VIRTUAL MACHINE INTERFACE AND LOCAL GRAPHICAL USER INTERFACE ON A THIN CLIENT AND ALTERNATING THEREBETWEEN

FIELD

The present disclosure generally relates to thin clients or zero clients and virtual machines, and more particularly to systems and methods for alternating between a local graphical user interface and a virtual machine interface on a thin or zero client.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Traditional network-based computer architectures generally involve multiple traditional personal computers, each of which comprises its own computing system components such as a central processing unit, memory, etc., each of which is connected to a centralized server or servers. Management of resources in such architectures, however, has become increasingly complex as the size of networks continues to grow. In addition to the physical logistics of such a network, problems such as asset management, support costs, troubleshooting, etc., all make such an architecture potentially unworkable. Further, in many cases, network users do not need the resources or computing power offered by a personal computer, and therefore these expensive resources are underutilized in such architectures.

To combat the inefficiencies of traditional network-based computer architectures making extensive use of personal computers, many network-based architectures have transitioned to a server-based computing models, such as thin client or zero client. Typically, a zero client or thin client is heavily dependent on another computer system or server, which generally fulfills the computational rolls for the zero client or ultrathin client. In such cases, the zero client is simply a low-end computer terminal, which includes peripherals such as a monitor, keyboard, and mouse, that also provides a graphical user interface (GUI) to the user. In such configurations, a central computer system or server hosts the operating systems and software applications utilized by the thin client or zero client.

Generally, a system user utilizes the thin or zero client's local GUI to provide credentials that allow the user to access a desktop operating system that is hosted within a virtual machine running on the centralized server. Once the user provides the credentials to access the virtualized desktop, those resources are displayed on the user's monitor, and the resources for providing the local GUI are terminated. When the user finishes with the virtualized desktop, however, the entire thin client or zero client must be powered down and restarted to reboot the local GUI, which results in wasted time and system resources.

Therefore, an unaddressed need exists in the art to address the aforementioned deficiencies and inadequacies.

SUMMARY

Technologies are described herein for alternating between a local graphical user interface (UI) and a virtual machine interface, on a computing device such as a thin client or a zero client. In particular, according to one aspect, a virtual desktop client (VDC), which is in communication with a virtual machine hosted by a hypervisor on a remote computer system, receives desktop video display signals from the virtual machine. A monitoring application monitors the execution status of the VDC. In one embodiment, upon determining that the VDC has been terminated, the monitoring application is configured to present the UI by re-initializing, relaunching, or rebooting the UI, by retrieving display data associated with the UI from a RAM device, or by other means.

A further aspect of the present disclosure relates to a computing device comprising: a system on chip (SOC); a video card; a random access memory (RAM); and a non-volatile memory storing a local graphical user interface (UI) configured to receive input from a user of the computing device, wherein the UI is configured to communicate with a virtual machine (VM) hosted by a hypervisor of a remote computer system, and wherein the UI is configured to initialize a virtual desktop client (VDC); the VDC, wherein the VDC is configured to communicate with the VM hosted by the hypervisor and receive desktop video display signals from the VM hosted by the hypervisor and send signals associated with input from a user to the VM hosted by the hypervisor; and a monitoring application, wherein the monitoring application is configured to determine an execution status of the VDC and, in response to a determination that the VDC has been terminated, present the UI.

One further aspect of the present disclosure relates to a method comprising the steps of receiving via a local graphical interface (UI) input from a user of a computing device, wherein the UI is configured to communicate with a virtual machine (VM) hosted by a hypervisor of a remote computer system; initializing via the UI a virtual desktop client (VDC), wherein the VDC is configured to communicate with the VM hosted by the hypervisor of the remote computer system; receiving via the VDC desktop video display signals from the VM hosted by the hypervisor of the remote computer system; monitoring via a monitoring application an execution status of the VDC; and, upon determination by the monitoring application that the VDC has been terminated, presenting via the monitoring application the UI.

Yet one further aspect of the present disclosure relates to a non-transitory computer readable medium storing executable instructions configured to cause a computer system to execute a method comprising: receiving via a local graphical interface (UI) input from a user of a computing device, wherein the UI is configured to communicate with a virtual machine (VM) hosted by a hypervisor of a remote computer system; initializing via the UI a virtual desktop client (VDC), wherein the VDC is configured to communicate with the VM hosted by the hypervisor of the remote computer system; receiving via the VDC desktop video display signals from the VM hosted by the hypervisor of the remote computer system; monitoring via a monitoring application an execution status of the VDC; and, upon determination by the monitoring application that the VDC has been terminated, presenting via the monitoring application the UI.

These and other aspects of the present disclosure will become apparent from the following description of the preferred embodiments taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 1:
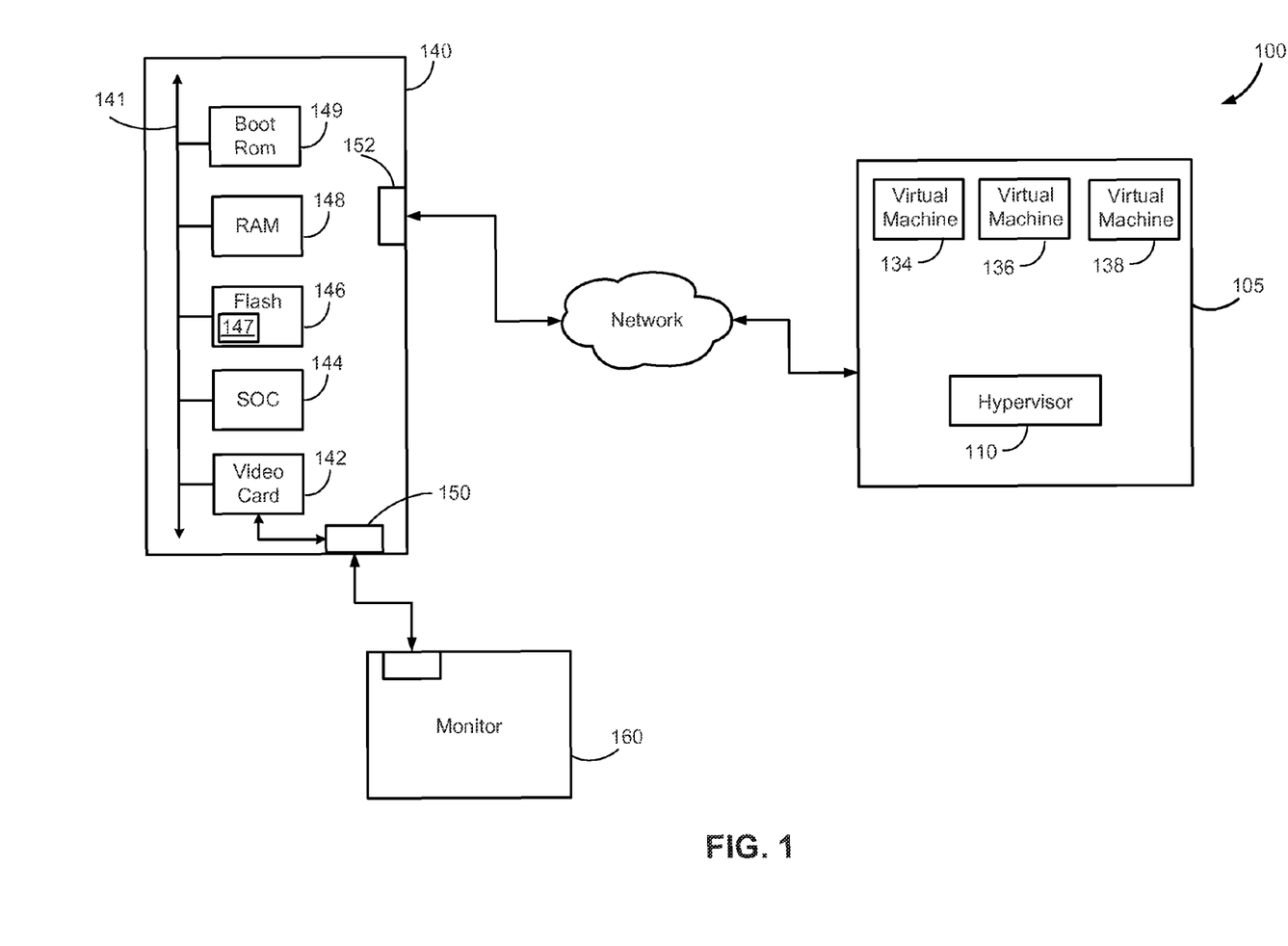
FIG. 1 illustrates an environment in which an embodiment of a thin client or zero client is operatively connected to a computer system hosting multiple virtual machines or unprivileged domains, according to certain embodiments of the present disclosure.

FIG. 1 shows an environment 100 in which an embodiment of a thin client or zero client 140 is operatively connected to a computer system 105 hosting multiple virtual machines or unprivileged domains (e.g., 134, 136, and 138), which are managed by a hypervisor 110, according to certain embodiments of the present disclosure. As shown in the FIG. 1 embodiment, the client 140 is configured to operatively connect to the computer system 105 via a network 170 such as the Internet. In alternate embodiments, the client 140 and computer system 105 may be interconnected via a local area network (LAN) or wide area network (WAN). The connection between the client 140 and the computer system 105 may be configured to display and audio to the client 140 as well as keyboard or mouse input/output to the computer system 105 by means of a single protocol (e.g., the TCP/IP protocol).

As shown, FIG. 1 schematically illustrates a thin client or zero client 140 in accordance with certain embodiments of the present disclosure. As previously noted, a thin client or zero client 140 generally is a computer that relies heavily on some other computer system or server (e.g., 105) to fulfill its computational roles. In certain embodiments, a thin client or zero client 140 comprises a local operating system, though this local operating system typically provides basic functionalities such as a local graphical interface. For example, in one embodiment, the local operating system may be a kernel such as the LINUX kernel. In certain embodiments, the thin client or zero client comprises a system on a chip (SOC) 142, video card 144, a non-volatile memory (such as a flash memory) 146, and a random access memory (RAM) 148, which are in communication with each other through a system bus 141. Further, as shown in the FIG. 1 embodiment, the thin client 140 comprises a boot rom 149. The client 140 may comprise additional physical or virtual components not shown in the FIG. 1 embodiment. Further, though the FIG. 1 environment 100 shows only a single thin client 140, it is common for multiple thin clients or zero clients to exist as components of a broader computer infrastructure wherein each of the clients share resources from the same server or computer system 105.

In one embodiment, a thin client 140 is a computer terminal or other housing connected to a monitor or computer display 160 that provides a graphical user interface (alternatively, GUI, local GUI, UI) to a user, as will be discussed further. In the FIG. 1 embodiment, the client 140 does not include a conventional operating system as it receives such resources from the computer system 105 (as will be discussed). The client 140 may, however, comprise an operating system in various other embodiments.

The SOC 142 can be any suitable SOC that may contain digital, analog, mixed-signal, and radio-frequency functions. Generally, the SOC 142 comprises various hardware components (e.g., processor core, timing sources, external interfaces, analog interfaces, voltage regulators, etc.) as well as related software. Further, in certain embodiments, the SOC 142 can be configured to read and execute code from a preset location of the flash memory 146. For example, a loader program, which can load additional code, can be placed at a preset location.

In certain embodiments, the boot rom 149 contains the initial code that the SOC 142 executes after a power-on reset. For example, the initial code can include necessary code and configurations to initialize the flash memory 146. Subsequently, the initial code can instruct the SOC 144 to load a boot program from a predetermined location in the flash memory 146. In certain embodiments, the boot rom 149 can be a small piece of mask ROM or write-protected flash embedded inside the SOC 144, an EPROM chip, etc.

As shown in the FIG. 1 embodiment, the client 140 comprises various memory elements such as a flash memory device 146 and a random-access memory (RAM) device 148, which are configured in accordance with certain embodiments of the present disclosure. In one embodiment, the memory devices (e.g., 146 and 148) are not user-modifiable and are simply involved in the operation of the client 140. In other embodiments, the memory devices (e.g., 146 and 148) may be user-modifiable and may be used to store data and information relating to the operation of the client 140.

Generally, the flash memory 146 stores information in an array of memory cells made from floating-gate transistors. Such a configuration is different in nature from other volatile or non-volatile memory because the information or data stored therein must be erased before new data can be written into the memory cells. In general, there are two common types of flash memory: NAND-type (named after NAND logic gates) and NOR-type (named after NOR logic gates). In a NAND-type flash memory, data may be written and read in "blocks" or "pages," which are the basic accessible memory units. The NOR-type flash memory allows a single machine word (i.e., byte) to be written or read independently. In either flash memory type, however, the erasing process is limited to erasing one block at a time. In other words, the flash memory 146 does not offer random-access erasing or rewriting operations. In other embodiments the flash memory 146 may be provided as a serial peripheral interface (SPI) flash memory.

In one embodiment, the flash memory 146 stores a boot program 147 that includes code and configurations that, when executed by the SOC 144, can test and initialize some or all of the components of the thin client or zero client 140. Further, the boot program 147 may include code and configurations that, when executed by the SOC 144 can initialize a local graphical user interface 315 and a monitoring application 310, as will be described below.

In one embodiment, the RAM device 148 has a boot memory space that is utilized by a boot program, a general area, and a graphic area, as will be discussed in connection with FIG. 3. In certain embodiments, the graphic area may comprise one or more graphic planes, as will be discussed in connection with FIG. 4.

As further shown in the FIG. 1 embodiment, the client 140 comprises a video card 142 (i.e., video adapter, graphics card, display card, etc.). In general, the video card 142 converts binary data into images displayed on the monitor 160. In one embodiment, the video card 142 comprises a processor (i.e., graphics processing unit or GPU) and a small amount of embedded memory but also utilizes the RAM 148 of the client 140.

According to one embodiment, in such a configuration (i.e., shared graphics memory), a mechanism exists (e.g., via the BIOS or a jumper setting) to select the amount of system memory that will be dedicated to displaying graphics. As will be discussed further in connection with FIGS. 3-4, in certain embodiments, the video card 142 can access the graphic area in the RAM device 148.

In one embodiment, the client also comprises a connection system 150 between the video card 142 and the monitor or computer display 160. In one embodiment, the connection system 150 is a video graphics array (VGA, VGA connector), which is an analog-based standard interface. Alternatively, in one embodiment, the connection system 150 is a digital visual interface (DVI), with is the digital-based standard design for most flat-panel displays. In other embodiments, the connection system 150 may be a high-definition multimedia interface (HDMI) or other connection means familiar to one of ordinary skill in the art. As will be discussed, in one embodiment, the video card is configured to transmit both a local GUI and/or the user interface of a virtual machine or operating system to the monitor 160, as will be discussed.

Additionally, as shown in the FIG. 1 embodiment, the client 140 comprises an interface 152, which is a physical input/output hardware device such as a USB port. In one embodiment, the interface 152 allows a user to connect various peripherals to the client 140 such as human interface devices including a keyboard or mouse (or any other human interface devices), with which the user can interact with the local GUI and/or the user interface of a virtual machine. Alternatively, in other embodiments any other serial bus protocol aside from USB may be used as desired.

Figure 2:
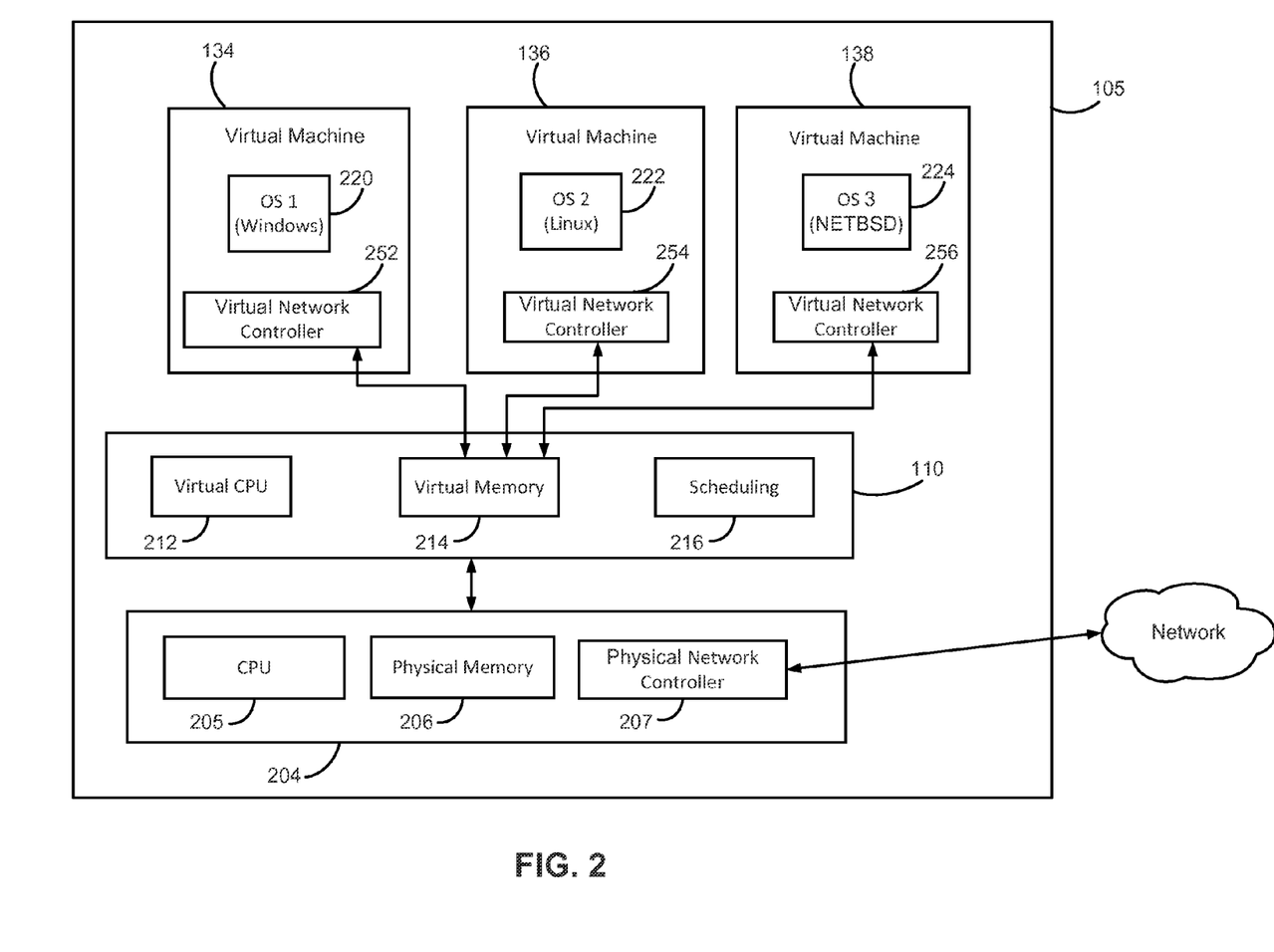
FIG. 2 schematically illustrates a computer system in which a hypervisor hosts multiple virtual machines or unprivileged domains in accordance with certain embodiments of the present disclosure.

FIG. 2 illustrates a more detailed view of computer system 105 in which a hypervisor 110 hosts multiple virtual machines (i.e., unprivileged domains) 134, 136, 138 in accordance with certain embodiments of the present disclosure. Virtualization allows a number of virtual servers (such as an operating system 220, 222, 224) to be consolidated into a single physical machine 204, without losing the security gained by having completely isolated environments. Virtualization makes it relatively easy to migrate virtual machines from one physical computer to another, thus making it easy to maintain redundant virtual server images synchronized across physical machines. A virtual machine gets certain features, such as cloning, at a very low cost. A virtual machine can be migrated to another host if the hardware begins to experience faults or if an upgrade is scheduled. The virtual machine can then be migrated back to the original machine when the original machine is working again. Further, a virtual machine can be accessed by a thin client or zero client 140 that is able to utilize the resources offered by the virtual machine without allocating the client's 140 local resources to hosting an operating system locally.

In certain embodiments, a hypervisor 110 is running on the computer system 105. Stated in a simplified way, the hypervisor 110 runs on top of the hardware including the CPU 205 and the physical memory 207. In certain embodiments, the hypervisor 110 can be stored or pre-built in a flash ROM of the computer system 105. Alternatively, the hypervisor can be stored or pre-built in the hard drive of the computer system 105. The hypervisor has, among other thing, virtual CPUs 212, virtual memories 214, and scheduling services 216. Further, in one embodiment, the hypervisor 110 hosts virtual machines or domains 134, 136, 138, which encapsulate a complete running virtual environment. According to one embodiment, a thin client or zero client 140 can access one of the virtual machines (e.g., 134, 136, 138) and interface with the graphical interface of the virtual machine at the monitor 160 connected to the client 140. According to certain embodiments, the connectivity between the virtual machine (e.g., 134) and the monitor 160 of the client 140 is provided via a virtual desktop client (VDC) using a standard or proprietary protocol such as a Remote Desktop Protocol (RDP) client or a Virtual Network Computing (VNC) client, as will be discussed in relation to FIG. 4. Further, in one embodiment, each VDC or an RDP client is in communication with one of the operating systems running on the virtual machines hosted by the hypervisor 110, and the VDC or RDP client transmits user input signals to the operating system through one or more virtual desktop protocols supported by the operating system, while operating system in turn transmits or redirects video display signals or video display data to the VDC or RDP client. In alternate embodiments, the VDC or RDP client may be in communication with the hypervisor 110 or a server-side client that is in communication with the hypervisor 110.

One skilled in the art would appreciate that the hypervisor 110 can also run on two CPUs, four CPUs, eight CPUs, or any suitable number of CPUs. The hypervisor 110 can be of various types and designs, such as CITRIX, XEN, MICROSOFT HYPER-V, VMWARE ESX. The hypervisor 110 can emulate one or more virtual machines or domains 134, 136, 138. An operating system 220, 222, 224 can be installed in a virtual machine 134, 136, 138. The operating system 220, 222, 224 may not realize that it is running on virtual machine and may perceive that it is running on a physical machine. The operating systems 220, 222, 224 running on the virtual machine 134, 136, 138 can host one or more application programs.

In certain embodiments, the hypervisor 110 hosts one or more virtual machines (unprivileged domains) 134, 136, 138. According to one embodiment, each of the virtual machines 134, 136, 138 can run an operating system or other guest. For example, the first virtual machine 134, the second virtual machine 136, and the third virtual machine 138 can run WINDOWS, LINUX, and NETBSD operating systems (or various other operating systems), respectively, any of which may be accessed by a thin client or zero client 140. In one embodiment, the operating system (e.g., 220) can be collective management software for managing the operation of various resources or processes that may be utilized by the client 140. For example, the operating system (e.g., 220) can include a set of functional programs that control and manage operations of devices that may be connected to the client 140. Generally, the set of application programs provide certain utility software for the user to manage the client 140 or various other computing processes. In certain embodiments, the operating system is operable to multitask, i.e., execute computing tasks in multiple threads.

Further, in one embodiment, a virtual machine 134, 136, 138 can provide a virtual network controller 252, 254, 256. From the perspective of an operating system or other guest run in the virtual machine 134, 136, 138, the virtual network controller 252, 254, 256 appears as a physical network controller. The operating system 220, 222, 224 can utilize the virtual network controller 252, 254, 256 to access the network. For example, the operating system 220 in the virtual machine 134 can have a network interface for communicating with the virtual network controller 252. To support the operating system 220 run in the virtual machine 134 in accessing an Ethernet network and/or IP network, the virtual network controller 252 can be assigned a MAC address 264 and/or IP address 266, which can be utilized in interfacing with the thin client or zero client 140.

Figure 3:
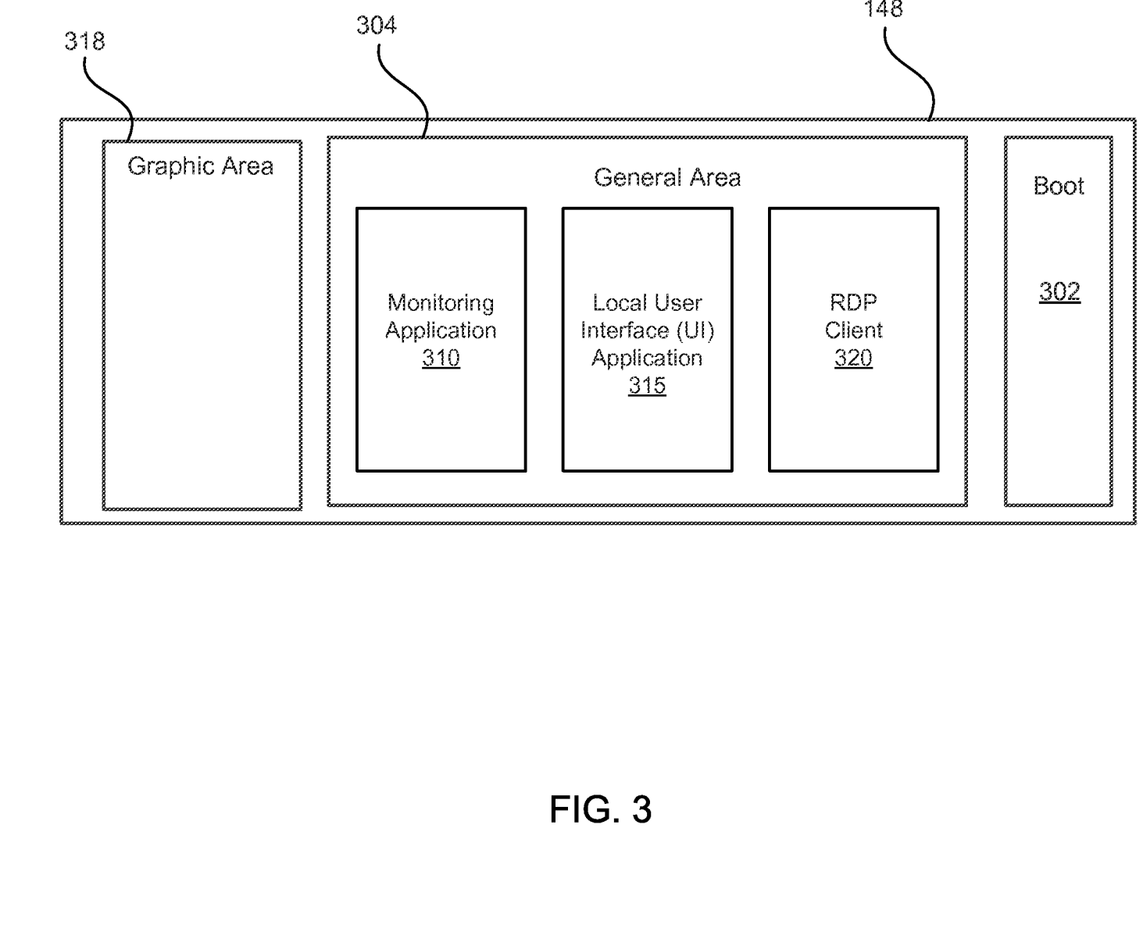
FIG. 3 schematically illustrates a RAM device configured in accordance with certain embodiments of the present disclosure.

FIG. 3 schematically illustrates a RAM device 148 configured in accordance with certain embodiments of the present disclosure. The RAM device 148 can be any suitable type, such as DDR3. Typically, the RAM device 148 has a boot memory 302 that is utilized by a boot program as well as other memory (i.e., general area 304) that is accessible to and utilized by various other devices on the client 140 (e.g., SOC 144, video card 144, etc.).

As shown in the FIG. 3 embodiment, the general area 304 of the RAM 148 comprises a local user interface (UI) application 315. In one embodiment, the UI 315 allows a user to interact with the client 140 and provide various user credentials (e.g., user name, password, etc.), which may be used to select and boot up a VM (e.g., 134) for use on the client 140. In one embodiment, the UI 315 receives user input via a peripheral device such as a keyboard or mouse. In certain embodiments, a boot program 147 initializes the UI application 315 in a process and loads the application 315 to the memory area 304 for execution. The SOC executes the UI application 315 and generates image frame data, which are subsequently placed in the graphic area 318 of the RAM device 148. The graphic area 318 is also accessible by the video card 142, which subsequently processes the image frame data and generates video output signals accordingly. The video output signals are transmitted from a video output of the thin client 140 to a video input of the monitor 160.

In certain embodiments, the boot program can also initiate another process executing a monitoring application 310, before, at the same time of, or after initiating the UI application 315.

As previously noted, a user may utilize the UI 315 to provide credentials (e.g., user name, password, etc.), which allow the user to select a particular virtual machine 134 to access via the client 140 during a particular session, i.e., the duration in which the user is engaging the particular virtual machine 134. Typically, when a user initiates a session with a particular virtual machine 134, a graphical interface for interfacing with the virtual machine 134 is provided from the computer system 105 to the client 140 via a network connection.

According to one embodiment, the graphical interface for interfacing the virtual machine 134 is provided via the Remote Desktop Protocol (RDP), which is a client application allowing a user to access and control resources at a remote computer (e.g., computer system 105). Alternatively, the graphical interface for interfacing the virtual machine 134 may be provided as part of a virtual desktop infrastructure (VDI) via a commercial product such as XENDESKTOP as provided by CITRIX or HORIZON VIEW as provided by VMWARE, according to one embodiment.

To utilize RDP, as shown in the FIG. 3 embodiment, the RAM device 148 comprises RDP client software 320. Additionally, the computer system 105 will generally comprise RDP server software. In one embodiment, when the SOC 144 executes the RDP client software 320, the RDP server software responds by providing display data for the virtual machine 134. In one embodiment, the RDP server software receives the display data from the hypervisor 110. According to one embodiment, the RDP client 320 routes the display data to the graphic area 318 where it can be accessed and processed by the video card 142 such that it can be displayed on the monitor 160.

As further shown in FIG. 3, according to one embodiment, the RAM device 148 further comprises a monitoring application 310 for determining when a user is engaged in an active session with a VM (e.g., 134). Further, in one embodiment, when the monitoring application 310 determines the user has disengaged a session with the VM 134, the monitoring application 310 is configured present the local UI 315 to the user according to various means such as rebooting, re-initializing, or relaunching the local UI 315, by retrieving display data associated with the local UI 315 from a graphic plane in the RAM device 148, or various other means.

According to one embodiment, the monitoring application 310 is configured to monitor whether the RDP client software 320 has been terminated. For example, in one embodiment the monitoring application 310 may utilize an application programming interface (API), a system call, and/or a memory scan to monitor whether the SOC 144 is executing the RDP client 320 or whether the processor process executing the RDP client has been terminated. Further, the monitoring application 310 may be configured to detect when the SOC 144 begins executing the RDP client 320 (i.e., when the user begins a session with the VM 134). Subsequently, in one embodiment, the monitoring application 310 is configured to continue monitoring the SOC 144 to determine when the SOC 144 is no longer executing the RDP client 320 (e.g., the monitoring application 310 determines the user has terminated the session with the VM 134).

The monitoring application 310 may employ alternate methods for determining when a user is engaged in an active session with a VM 134. For example, in one embodiment, the RDP client 320 may be configured to communicate with the RDP server software via a specified port on the thin client 140, and the monitoring application 310 is configured to monitor activity on the particular thin client 140 port. When the monitoring application 310 first determines there is activity on the specified port, the application 310 determines the user has initiated a session with the VM 134. Subsequently, upon determining there is no activity on the specified port, the monitoring application 310 determines the session has been terminated. In one further embodiment, the RDP server software may be configured to utilize a particular port (i.e., port 3389) on the computer system 105, and the monitoring application 310 may be configured to monitor the activity on the specific computer system 105 port. For example, the monitoring application 310 may be configured to send packets to the specific port, and if the monitoring application 310 receives nothing in response (or an error response or packet indicating the port is closed), it is likely that the port is closed and therefore the RDP client 320 and RDP server software are not communicating (and the user is not conducting an active session). Alternatively, if the monitoring application 310 receives a response from the port, it is likely that the user is engaged in an active session. Upon making that determination, in one embodiment, the monitoring application is configured to continue sending packets until it receives no response (or error message or packet indicating the port is closed), thus suggesting the user has terminated the session with the VM 134. In one alternate embodiment, the monitoring application 310 may act as a parent process to the RDP client 320, in which case the monitoring application 310 launches the process of the RDP client 320 as a child. After the monitoring application 310 launches the process of the RDP client 320, the local operating system (e.g., kernel) may be configured to notify the monitoring application 310 as to when the process of the RDP client 320 has been terminated.

As noted, upon determining the process of the RDP client has been terminated, the monitoring application 310 is configured to present the local UI 315 to the user. In one embodiment, the monitoring application 310 calls a built-in section of code that is configured to re-initialize the local graphical user interface 315, for example, in a separate process. Alternatively, in one embodiment, upon determining the session with the VM 134 has been terminated, the monitoring application 310 may be configured to call a subroutine of the boot program 147 that, when executed by the SOC 144, re-initializes local UI 315. As will be understood and appreciated, re-initializing the local UI 315 without having to power down the entire thin client or zero client 140 is advantageous in that it saves time and system resources.

Figure 4:
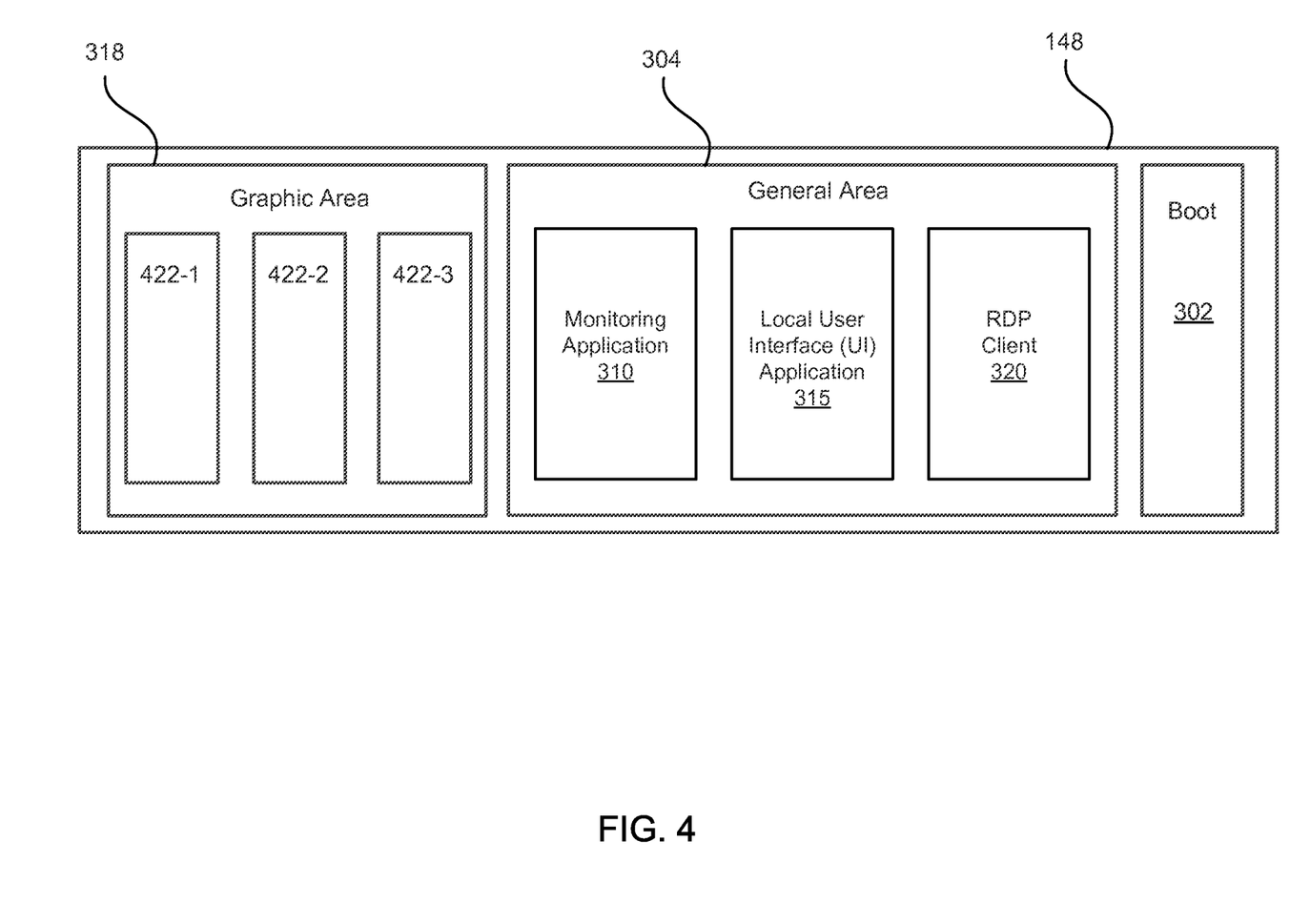
FIG. 4 schematically illustrates a RAM device configured in accordance with certain alternate embodiments of the present disclosure.

FIG. 4 schematically illustrates an alternative embodiment of RAM device 148 configured in accordance with certain embodiments of the present disclosure. As shown and previously discussed, the RAM device 148 has a boot memory 302 that is utilized by a boot program as well as other memory (i.e., general area 304) that is accessible to and utilized by various other devices on the client 140 (e.g., SOC 144, video card 144, etc.). As further shown in the FIG. 4 embodiment, the RAM 148 can have a frame buffer 318 that has one or more graphic planes or video memory planes 422. In one embodiment, display data associated with the local UI 315 is transferred to a particular video memory plane 422-3. In other words, the SOC executes the local UI, which generates image frame data and then places the generated UI image frame data in the video memory plane 422-3. Further, display data associated with a user's active session with the VM 134 is transferred to an alternate video memory plane 422-2. In other words, the SOC executes the RDP client, which generates RDP client image frame data and then places the generated image frame data in the video memory plane 422-2. According to one embodiment, the video card 142 is configured to access the various video memory planes (e.g., 422-3, 422-2) to retrieve display data, which can then be processed and displayed to the user depending on whether the user is conducting an active session with the VM 134 or instead requires the local UI 315.

As described above in relation to FIG. 3, in various embodiments the monitoring application 310 determines when a user is engaged in an active session with a VM (e.g., 134) and may employ various methods for determining when a user terminates a session with a VM 134. According to one embodiment, the video card 142 is configured such that as a default, the video card 142 retrieves data from the memory plane associated with the local UI 315 (i.e., 422-3). In one embodiment, when the monitoring application 310 determines the user has initiated a session with the VM 134, the monitoring application 310 is configured to notify the video card 142 to retrieve display data from the video memory plane associated with the VM 134 (i.e., 422-2) so that the video card 142 can process and display the VM 134 display. Effectively, upon receiving indication from the monitoring application 310 that the user has initiated a session with the VM 134, the video card 142 will switch from retrieving, processing, and displaying the local UI 315 display data to retrieving, processing, and displaying the VM 134 display data, according to one embodiment.

Further, according to one embodiment, upon determining that the user has terminated a session with the VM 134 (as described in relation to FIG. 3), the monitoring application 310 may be configured to subsequently notify the video card 142 that the session has terminated and the video card 142 should therefore cease retrieving display data from the memory plane associated with the VM 134 (i.e., 422-2) and begin retrieving, processing, and displaying data from memory plane 422-2 (i.e., the memory plane associated with the local UI 315). As described previously, upon receiving indication that the user has terminated the session with the VM 134, the video card 142 effectively switches from retrieving, processing, and displaying display data from memory plane 422-2 (the memory plane associated with the VM 134) to retrieving, processing, and displaying display data associated with the local UI 315 from memory plane 422-3.

In one embodiment, the video card 142 comprises a handler to receive notifications from the monitoring application 310. Upon receiving an indication, the handler is configured to execute specific instructions that instruct the video card 142 to switch the location from which the video card 142 is currently retrieving display data to be processed and displayed. For example, in one embodiment, the video card may comprise an interrupt handler, and the monitoring application 310 may be configured to send an interrupt to the video card 142 upon determining a VM 134 session has been terminated. According to the embodiment, upon receiving the interrupt, the interrupt handler is configured to execute and instruct the video card 142 to begin retrieving the display data relating to the local UI 315.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system comprising:
a virtual machine server computer, configured to execute a hypervisor, wherein the hypervisor, when executed, is configured to host a plurality of virtual machines (VMs); and
a computing device communicatively connected to the virtual machine server computer via a network and functioning as a client to the virtual machine server computer, the computing device comprising:
a system on chip (SOC);
a graphics card or a video card;
a random access memory (RAM); and
a non-volatile memory storing a local graphical user interface (UI), a virtual desktop client (VDC) and a monitoring application;
wherein the UI, when executed by the SOC, is configured to
receive a first input from a user of the computing device for one of the VMs hosted by the hypervisor of the virtual machine server computer,
in response to the first input, communicate with the virtual machine server computer to engage the user in a session with the VM indicated by the first input, and
when the user is engaged in the session with the VM, initialize the VDC;
wherein the VDC, when executed by the SOC, is configured to, when the user is engaged in the session with the VM,
communicate with the VM hosted by the hypervisor and receive desktop video display signals from the VM hosted by the hypervisor,
send signals associated with a second input from the user to the VM hosted by the hypervisor; and
in response to the session with the VM being disengaged, terminate the VDC;
wherein the monitoring application is configured to
determine an execution status of the VDC, and
in response to a determination that the VDC has been terminated, present the UI.

2. The system of claim 1, wherein the computing device is a thin client.

3. The system of claim 1, wherein the computing device is a zero client.

4. The system of claim 1, wherein the first input received from the user of the computing device is selected from the group comprising: user name; password; selection of a virtual machine.

5. The system of claim 1, wherein the non-volatile memory further stores a boot program, wherein the SOC is configured to load the boot program into the RAM, wherein the boot program is configured to, when executed by the SOC, initialize the RAM and the graphics card or the video card.

6. The system of claim 1, wherein the RAM comprises a graphic area for receiving image frame data.

7. The system of claim 6, wherein the graphics card or the video card is configured to retrieve image frame data from a graphic area of the RAM.

8. The system of claim 7, wherein the graphics card or the video card is further configured to process the image frame data and generate video output signals.

9. The system of claim 6, wherein the graphic area comprises one or more graphic planes.

10. The system of claim 9, wherein display data associated with the UI is transferred to a particular graphic plane.

11. The system of claim 10, wherein the monitoring application is configured to present the UI by notifying the graphics card or the video card to retrieve the display data associated with the UI from the particular graphic plane.

12. The system of claim 1, wherein the monitoring application is configured to present the UI by re-initializing the UI.

13. A method of monitoring virtual desktop communication in a system by a monitoring application, the method comprising:
    executing, at a computing device, a local graphical user interface (UI) stored in a non-volatile memory of the computing device, wherein the computing device is communicatively connected to a virtual machine server computer via a network and functioning as a client to the virtual machine server computer and functioning as a client to the virtual machine server computer, wherein the virtual machine server computer is configured to execute a hypervisor, wherein the hypervisor, when executed, is configured to host a plurality of virtual machines (VMs), and wherein the computing device comprises the non-volatile memory storing the UI, a virtual desktop client (VDC) and the monitoring application;
    receiving, at the computing device via the UI, a first input from a user of the computing device for one of the VM hosted by the hypervisor of the virtual machine server computer;
    in response to the first input, communicating, by the UI executed at the computing device, with the virtual machine server computer to engage the user in a session with the VM indicated by the first input;
    when the user is engaged in the session with the VM, initializing, via the UI, the VDC;
        communicating, by the VDC, with the VM hosted by the hypervisor, and receiving, via the VDC, desktop video display signals from the VM hosted by the hypervisor of the remote computer system;
        sending, by the VDC, signals associated with a second input from the user to the VM hosted by the hypervisor; and
        in response to the session with the VM being disengaged, terminating the VDC;
    monitoring, via the monitoring application an execution status of the VDC; and
    in response to a determination by the monitoring application that the VDC has been terminated, presenting via the monitoring application the UI.

14. The method of claim 13, wherein the computing device is a thin client or a zero client.

15. The method of claim 13, wherein the computing device further comprises a system on chip (SOC), a graphics card or the video card, and a random access memory (RAM).

16. The method of claim 15, wherein the RAM comprises a graphic area for receiving image frame data.

17. The method of claim 16, wherein the graphic area comprises one or more graphic planes, and further wherein display data associated with the UI is transferred to a particular graphic plane.

18. The method of claim 17, wherein the monitoring application is configured to present the UI by notifying the graphics card or the video card to retrieve the display data associated with the UI from the particular graphic plane.

19. The method of claim 13, wherein the monitoring application is configured to present the UI by re-initializing the UI.

20. A non-transitory computer readable medium storing executable instructions configured to cause a computing device to execute a method comprising:
    executing, at the computing device of a system, a local graphical user interface (UI) stored in a non-volatile memory of the computing device, wherein the computing device is communicatively connected to a virtual machine server computer of the system via a network and functioning as a client to the virtual machine server computer and functioning as a client to the virtual machine server computer, wherein the virtual machine server computer is configured to execute a hypervisor, wherein the hypervisor, when executed, is configured to host a plurality of virtual machines (VMs), and wherein the computing device comprises the non-volatile memory storing the UI, a virtual desktop client (VDC) and the monitoring application;
    receiving at the computing device via the UI, a first input from a user of the computing device for one of the VM hosted by the hypervisor of the virtual machine server computer;
    in response to the first input, communicating, by the UI executed at the computing device, with the virtual machine server computer to engage the user in a session with the VM indicated by the first input;
    when the user is engaged in the session with the VM, initializing, via the UI, the VDC;
        communicating, by the VDC, with the VM hosted by the hypervisor, and receiving, via the VDC, desktop video display signals from the VM;
        sending, by the VDC, signals associated with a second input from the user to the VM hosted by the hypervisor; and
        in response to the session with the VM being disengaged, terminating the VDC;
    monitoring, via the monitoring application an execution status of the VDC; and
    in response to a determination by the monitoring application that the VDC has been terminated, presenting via the monitoring application the UI.

21. The computer readable medium of claim 20, wherein the computing device further comprises a system on chip (SOC), a graphics card or the video card, and a random access memory (RAM).

22. The computer readable medium of claim 21, wherein the RAM comprises a graphic area for receiving image frame data.

23. The computer readable medium of claim 22, wherein the graphic area comprises one or more graphic planes, and further wherein display data associated with the UI is transferred to a particular graphic plane.

24. The computer readable medium of claim 23, wherein the monitoring application is configured to present the UI by notifying the graphics card or the video card to retrieve the display data associated with the UI from the particular graphic plane.

25. The computer readable medium of claim 20, wherein the monitoring application is configured to present the UI by re-initializing the UI.

26. The computer readable medium of claim 20, wherein the computing device is a thin client or a zero client.

* * * * *